(12) United States Patent
Imoto

(10) Patent No.: US 9,151,414 B2
(45) Date of Patent: Oct. 6, 2015

(54) COUPLING APPARATUS WITH ADJUSTABLY SUPPORTED PIPE JOINT MEMBER

(75) Inventor: Yuki Imoto, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 682 days.

(21) Appl. No.: 12/663,097

(22) PCT Filed: May 16, 2008

(86) PCT No.: PCT/JP2008/059005
§ 371 (c)(1),
(2), (4) Date: Dec. 4, 2009

(87) PCT Pub. No.: WO2008/149653
PCT Pub. Date: Dec. 11, 2008

(65) Prior Publication Data
US 2010/0181764 A1    Jul. 22, 2010

(30) Foreign Application Priority Data
Jun. 7, 2007    (JP) ................................. 2007-151197

(51) Int. Cl.
*F16L 5/14*     (2006.01)
*F16L 39/04*    (2006.01)

(52) U.S. Cl.
CPC .. *F16L 5/14* (2013.01); *F16L 39/04* (2013.01)

(58) Field of Classification Search
CPC .............. F16L 5/14; F16L 39/04; F16L 5/027
USPC ............ 285/139.1–139.3, 140.1, 141.1, 196, 285/338, 347; 403/240, 254, 259, 261
See application file for complete search history.

(56) References Cited

U.S. PATENT DOCUMENTS 2,180,960 A * 11/1939 Kennedy ...................... 285/192
2,255,333 A *  9/1941 Scheiwer ................... 251/149.6
(Continued)

FOREIGN PATENT DOCUMENTS

JP      56-119093      9/1981
JP      59-151687      8/1984
(Continued)

OTHER PUBLICATIONS

International Search Report issued Jun. 10, 2008 in International (PCT) Application No. PCT/JP2008/059005.

Primary Examiner — James Hewitt
Assistant Examiner — James Linford
(74) Attorney, Agent, or Firm — Wenderoth, Lind & Ponack, L.L.P.

(57) ABSTRACT

A pipe joint coupling apparatus has first and second pipe joint members coupled to each other, a plate-shaped support member with an opening through which the first pipe joint member extends, and an elastic member accommodated in an annular groove formed in the outer surface of the first pipe joint member. The support member is clamped between a shoulder part formed on the outer surface of the first pipe member and a collar member disposed about the first pipe joint member such that the edge of the opening of the support member engages the elastic member. The width of the groove is greater than the width of the support member to allow the first pipe joint member to be radially displaced relative to the support member with the opening edge partially and radially entering into the annular groove while deforming the elastic member.

3 Claims, 4 Drawing Sheets

(56) References Cited

U.S. PATENT DOCUMENTS

| | | | | |
|---|---|---|---|---|
| 2,359,846 A | * | 10/1944 | Hayman | 285/32 |
| 2,919,147 A | * | 12/1959 | Nenzell | 285/89 |
| 3,339,014 A | * | 8/1967 | Oxley | 174/153 R |
| 3,401,958 A | * | 9/1968 | Demyon | 285/208 |
| 3,423,518 A | * | 1/1969 | Weagant | 174/153 G |
| 3,751,999 A | * | 8/1973 | Jollivet | 285/139.1 |
| 3,905,789 A | * | 9/1975 | Carpenter | 62/299 |
| 4,094,358 A | * | 6/1978 | Neveux | 165/154 |
| 4,525,000 A | * | 6/1985 | Bachle | 285/148.23 |
| 4,613,169 A | * | 9/1986 | Engelhart | 285/139.2 |
| 4,637,639 A | * | 1/1987 | Jorgensen et al. | 285/249 |
| 6,179,340 B1 | * | 1/2001 | Adolf et al. | 285/140.1 |
| 6,186,557 B1 | * | 2/2001 | Funk | 285/39 |
| 6,193,284 B1 | * | 2/2001 | King | 285/139.2 |
| 6,761,380 B2 | * | 7/2004 | Pachciarz et al. | 285/204 |

FOREIGN PATENT DOCUMENTS

| | | | | |
|---|---|---|---|---|
| JP | 61-45695 | | 3/1986 | |
| JP | 06058463 A | * | 3/1994 | F16L 5/00 |
| JP | 7-38881 | | 7/1995 | |
| JP | 2005-344808 | | 12/2005 | |

\* cited by examiner

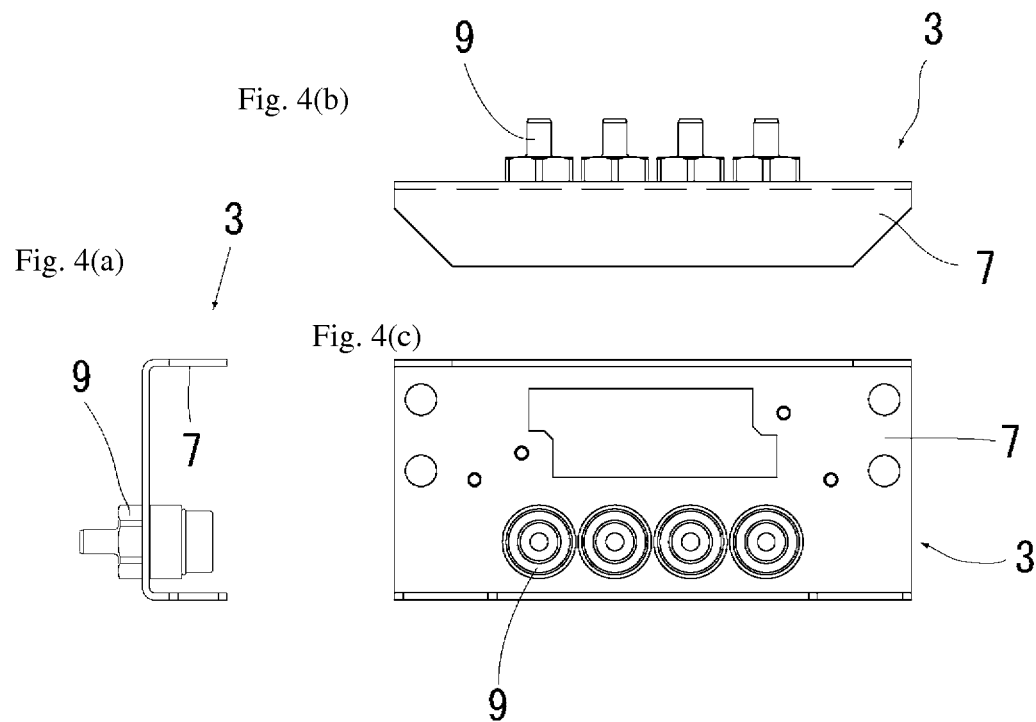
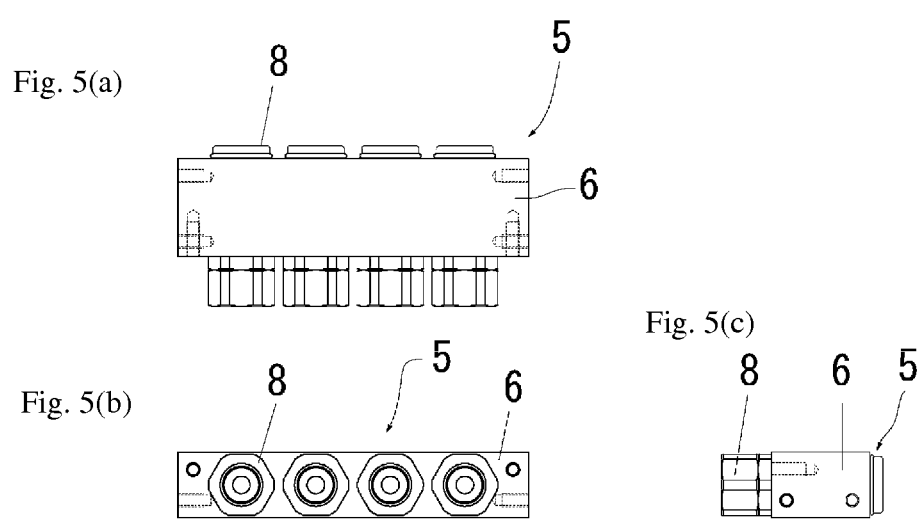

COUPLING APPARATUS WITH ADJUSTABLY SUPPORTED PIPE JOINT MEMBER

TECHNICAL FIELD

The present invention relates to a pipe joint coupling apparatus enabling pipe joint members to be coupled together and decoupled from each other.

BACKGROUND ART

Patent Literature 1 discloses a pipe joint coupling apparatus having one pipe joint member (socket S) mounted on a support member (securing plate 22) of a device to be connected. The support member is supported by a flange 20 formed on the outer peripheral surface of the one pipe joint member and a collar 23. In addition, an elastic member (O-ring 21) is disposed in an accommodating groove (circumferential groove 26) formed on the outer peripheral surface of the one pipe joint member to elastically retain the one pipe joint member with respect to the support member.

Patent Literature 1: Japanese Utility Model Registration Application Publication No. Hei 7-38881

DISCLOSURE OF INVENTION

Technical Problem

In the above-described pipe joint coupling apparatus disclosed in Patent Literature 1, the thickness of the support member is greater than the groove width of the accommodating groove. Therefore, when the elastic member is depressed by the support member upon adjustment of a misalignment between the mating pipe joint members, the opening edge of the support member abuts against the outer peripheral surface of the pipe joint member. Thus, the amount by which the elastic member can be depressed is restricted undesirably. Accordingly, it is impossible to increase the amount of adjustment available to correct a misalignment. In addition, because the thickness of the support member is large, it is difficult to achieve space savings.

An object of the present invention is to provide a pipe joint coupling apparatus capable of increasing the amount of adjustment available to correct a misalignment between pipe joints when they are coupled together and also capable of achieving space savings.

Solution to Problem

The present invention comprises one pipe joint member having an accommodating groove on its outer peripheral surface, an other pipe joint member coupled and locked to the one pipe joint member, a support member that supports the one pipe joint member, and a collar member that clamps the support member in cooperation with a shoulder part provided on the one pipe joint member. The support member has an opening with a diameter substantially equal to the outer diameter of the one pipe joint member. The accommodating groove has an elastic member accommodated therein. The support member has an opening edge facing the accommodating groove. The opening edge has one side surface slidably abutting against the shoulder part and the other side surface slidably abutting against an end surface of the collar member located opposite to the shoulder part. The elastic member accommodated in the accommodating groove allows the one pipe joint member to be displaceable relative to the support member in the radial direction of the one pipe joint member. The accommodating groove has a groove width greater than the plate thickness of the support member. When the one pipe joint member and the other pipe joint member are coupled together, the opening edge of the support member depresses the elastic member in the accommodating groove, causing deformation of the elastic member thus depressed, thereby allowing the one pipe joint member to be displaced relative to the support member.

In this pipe joint coupling apparatus, the groove width of the accommodating groove is greater than the plate thickness of the support member, and when the pipe joint members are coupled together, the opening edge of the support member depresses the elastic member in the accommodating groove, causing deformation of the elastic member thus depressed, thereby allowing the one pipe joint member to be displaced relative to the support member. Therefore, the opening edge of the support member can enter the accommodating groove without being blocked by the outer peripheral surface of the pipe joint member. Accordingly, it is possible to increase the amount of adjustment available to correct a misalignment between the pipe joint members when they are coupled together. In addition, because the plate thickness of the support member is smaller than the groove width of the accommodating groove, it is possible to achieve space savings and weight reduction.

Further, one side surface of the opening edge of the support member abuts against the shoulder part, and the other side surface of the opening edge of the support member abuts against the end surface of the shoulder part. In this way, the one pipe joint member is clamped with respect to the support member. Therefore, the support member can be surely clamped, and it is possible to suppress loosening of the one pipe joint member located in the opening of the support member.

A further aspect of the invention has one pipe joint member with an accommodating groove on its outer peripheral surface, an other pipe joint member coupled and locked to the one pipe joint member, a support member that supports the one pipe joint member, and a collar member that clamps the support member in cooperation with a shoulder part provided on the one pipe joint member. The support member has an opening with a diameter substantially equal to the outer diameter of the one pipe joint member. The accommodating groove has an elastic member accommodated therein. The support member has an opening edge facing the accommodating groove. The opening edge has one side surface slidably abutting against the shoulder part and the other side surface slidably abutting against an end surface of the collar member located opposite to the shoulder part. The elastic member accommodated in the accommodating groove and the collar member allow the one pipe joint member to be displaceable relative to the support member. The accommodating groove has a groove width greater than the plate thickness of the support member. When the one pipe joint member and the other pipe joint member are coupled together, the opening edge of the support member depresses the elastic member in the accommodating groove, causing displacement (in the axial direction of the pipe joint member) of the support member and displacement of the elastic member thus depressed, thereby allowing the one pipe joint member to be displaced relative to the support member In this pipe joint coupling apparatus, the groove width of the accommodating groove is greater than the plate thickness of the support member, and when the pipe joint members are coupled together, the opening edge of the support member depresses the elastic member in the accommodating groove, causing displacement of the support member and displacement of the elastic member thus depressed, thereby allowing the one pipe joint member to be displaced relative to the support member. Therefore, the opening edge of the support member can enter the accommodating groove without being blocked by the outer peripheral surface of the pipe joint member. Accordingly, it is possible to increase the amount of adjustment available to correct a misalignment between the pipe joint members when they are coupled together. In addition, because the plate thickness of the support member is smaller than the groove width of the accommodating groove, it is possible to achieve space saving and weight reduction.

Further, one side surface of the opening edge of the support member abuts against the shoulder part, while the other side surface of the opening edge of the support member abuts against the end surface of the shoulder part, and the one pipe joint member is clamped with respect to the support member by the elastic member accommodated in the accommodating groove and the collar member. Therefore, the support member can be surely clamped, and it is possible to suppress loosening of the one pipe joint member located in the opening of the support member.

A further aspect of the invention has the accommodating groove with a relief where a deformed part of the elastic member is located when the elastic member is deformed by being depressed by the opening edge of the support member.

Accordingly, when the opening edge of the support member is forced into the accommodating groove upon adjustment of a misalignment, a deformed part of the elastic member can move into the relief. Therefore, it is possible to increase the amount by which the elastic member can be depressed by the opening edge of the support member and hence possible to further increase the amount of adjustment available to correct a misalignment.

In the aspect described above, the groove width of the accommodating groove is greater than the length of the elastic member in the groove width direction, and the relief where the deformed part of the elastic member is located is formed at at least either one of two positions respectively closer to one and the other groove wall surfaces of the accommodating groove.

According to the aspect described above, the groove width of the accommodating groove is greater than the length of the elastic member in the groove width direction, and the relief where the deformed part of the elastic member is located is formed at at least either one of two positions respectively closer to one and the other groove wall surfaces of the accommodating groove. Therefore, even when the elastic member is displaced in the groove width direction of the accommodating groove, the elastic member can be surely depressed by the opening edge of the support member.

According to another aspect of the invention, the elastic member is an O-ring disposed along the circumferential direction of the pipe joint member. As the elastic member is an O-ring, the O-ring can be secured simply by fitting it in the accommodating groove. Thus, the assembling operation is facilitated.

According to another aspect of the invention the collar member is set movable in the direction of insertion of the pipe joint member. As the collar member is set movable in the direction of insertion of the pipe joint member, the support member can be surely clamped even when there are variations in the plate thickness of the support member or when there are dimensional errors in the plate thickness.

BRIEF DESCRIPTION OF DRAWINGS

FIG. 1(a) is an explanatory view illustrating the male joint member in a normal state and FIG. 1(b) is an enlarged view showing a main part of the male joint member shown in FIG. 1(a).

FIG. 4(a), FIG. 4(b) and FIG. 4(c) are diagrams showing a multiple male joint unit of the pipe joint coupling apparatus according to the present invention, of which FIG. 4(a) is a side view; FIG. 4(b) is a plan view; and FIG. 4(c) is a front view.

FIG. 5(a), FIG. 5(b) and FIG. 5(c) are diagrams showing a multiple female joint unit of the pipe joint coupling apparatus according to the present invention, of which FIG. 5(a) is a plan view; FIG. 5(b) is a front view; and FIG. 5(c) is a side view.

LIST OF REFERENCE SIGNS

Figure 1A:
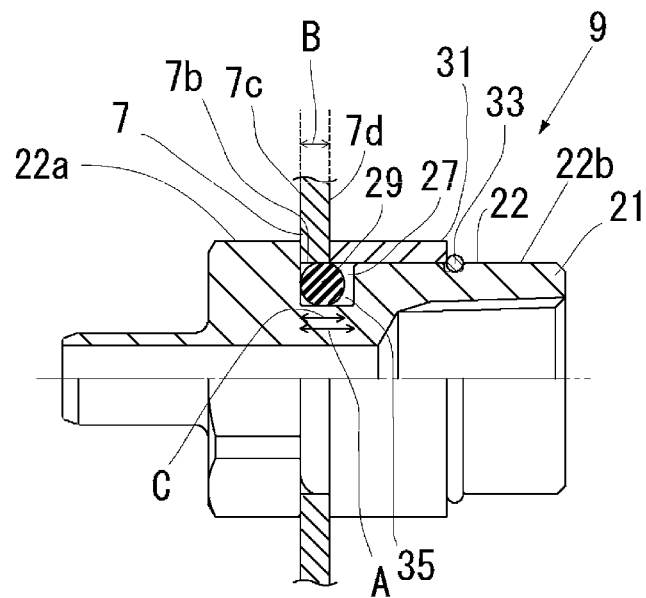
FIG. 1(a) and FIG. 1(b) are schematic views showing a male joint member of a pipe joint coupling apparatus according to the present invention, where

Pipe joint coupling apparatus 1; multiple male joint unit 3; multiple female joint unit 5; joint retaining member 6; plate (support member) 7; opening 7a; opening edge 7b; one side surface 7c; the other side surface 7d; female joint member (the other pipe joint member) 8; male joint member (one pipe joint member) 9; female joint body 11; fluid passage 13; valve 15; packing 17; spring 19; male joint body 21; outer peripheral surface 22; shoulder part 22a; fluid passage 23; pressing part 25; annular groove (accommodating groove) 27; O-ring (elastic member) 29, 29', 29"; collar member 31; stop ring 33; relief 35; fixed part 41; spring 43; movable part 45; and forward end 45a.

BEST MODE FOR CARRYING OUT THE INVENTION

An embodiment of the pipe joint coupling apparatus according to the present invention will be explained below with reference to the accompanying drawings. The pipe joint coupling apparatus 1 according to the present invention has a multiple male joint unit 3 secured to a device to be connected (not shown) and a multiple female joint unit 5 connectable to the multiple male joint unit 3.

The multiple female joint unit 5 has a substantially rectangular parallelepiped joint retaining member 6 and a plurality of female joint members (the other pipe joint member) 8 retained in the joint retaining member 6. The female joint members 8 are disposed in a straight line along the longitudinal direction of the joint retaining member 6.

Figure 3:
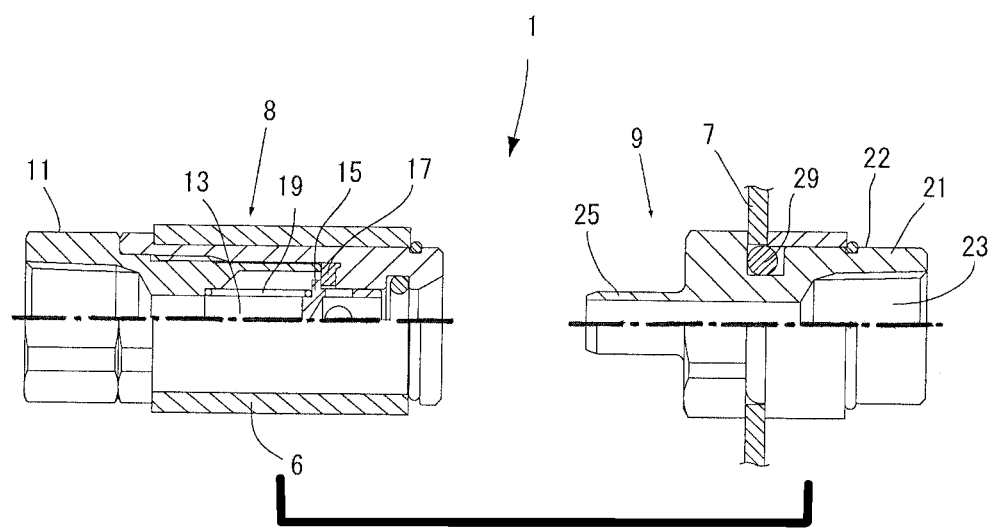
FIG. 3 is a schematic view showing a male and female joint member according to the present invention.

As shown in FIG. 3, each female joint member 8 has a substantially circular cylindrical female joint body 11, a fluid passage 13 formed in the female joint body 11, a valve 15 that opens and closes the fluid passage 13, a packing 17 pressed against the valve 15 to close the fluid passage 13, and a spring 19 that urges the valve 15 along the fluid passage 13.

As shown in FIG. 4, the multiple male joint unit 3 has a plate (support member) 7 formed by sheet metal working and a plurality of male joint members (one pipe joint member) 9 retained by the plate 7. The plate 7 has openings 7a formed in a straight line along the longitudinal direction of the plate 7. The openings 7a each have a diameter substantially equal to the outer diameter of each male joint member 9. Each opening 7a has one male joint member 9 disposed therein.

As shown in FIG. 3, each male joint member 9 has a substantially circular cylindrical male joint body 21 and a fluid passage 23 formed in the male joint body 21. The male joint body 21 has a pressing part 25 formed at its forward end. When the male joint member 9 is connected to the corresponding female joint member 8, the pressing part 25 forces the valve 15 in the female joint body 11 to move inward to open the fluid passage 13.

The male joint body 21 has an annular groove (accommodating groove) 27 formed circumferentially on its outer peripheral surface 22. An O-ring (elastic member) 29 is accommodated in the annular groove 27. The groove width (shown by A in FIG. 1) of the annular groove 27 is greater than the plate thickness (shown by B in FIG. 1) of the plate 7. Further, the length (shown by C in FIG. 1) of the O-ring 29 in the groove width direction is greater than the plate thickness B of the plate 7 and smaller than the groove width A of the annular groove 27.

An annular collar member 31 is provided on the outer peripheral surface 22 of the male joint body 21 to close a part of the opening of the annular groove (accommodating groove) 27. The collar member 31 is secured to the outer peripheral surface 22 by a stop ring 33.

The end of the opening edge 7b of the plate 7 is in contact with the O-ring 29 in the annular groove 27. One side surface 7c of the opening edge 7b slidably abuts against one groove wall surface 27a (shoulder part 22a) of the annular groove 27. The other side surface 7d of the opening edge 7b slidably abuts against an end surface 31a of the collar member 31.

It should be noted that the male joint body 21 is provided with a shoulder part 22a made larger in diameter than an outer peripheral surface 22b at the rear end of the male joint body 21 to make the radial length (shown by D in FIG. 2) of the one groove wall surface 27a of the annular groove 27 in the radial direction of the male joint body 21 greater than the radial length (shown by E in FIG. 2) of the other groove wall surface 27b of the annular groove 27 in the radial direction of the male joint body 21.

The O-ring 29 has its front end 29a in the axial direction of the male joint body 21 abutting against the one groove wall surface 27a of the annular groove 27, whereas the rear end 29b of the O-ring 29 in the axial direction of the male joint body 21 is not in contact with the other groove wall surface 27b of the annular groove 27 to provide a gap between the rear end 29b of the O-ring 29 and the other groove wall surface 27b of the annular groove 27. The gap serves as a relief 35 where a deformed part of the O-ring 29 is located when the O-ring 29 is deformed by being depressed by the opening edge 7b of the plate 7.

The following is an explanation of the operation and advantageous effect of the above-described embodiment. In the operation of coupling together the joint members, the male joint members 9 of the multiple male joint unit 3 and the corresponding female joint members 8 of the multiple female joint unit 5 are positioned relative to each other, and the male joint members 9 are inserted into the corresponding female joint members 8 to couple together the joint members.

If there is a misalignment between the joint members when they are coupled together, the O-ring 29 is elastically deformed by being pressed against the opening edge 7b of the plate 7 when the male joint member 9 is inserted into the corresponding female joint member 8. Consequently, the male joint member 9 moves in the radial direction of the opening 7a relative to the plate 7. Thus, the misalignment is corrected.

Figure 2:
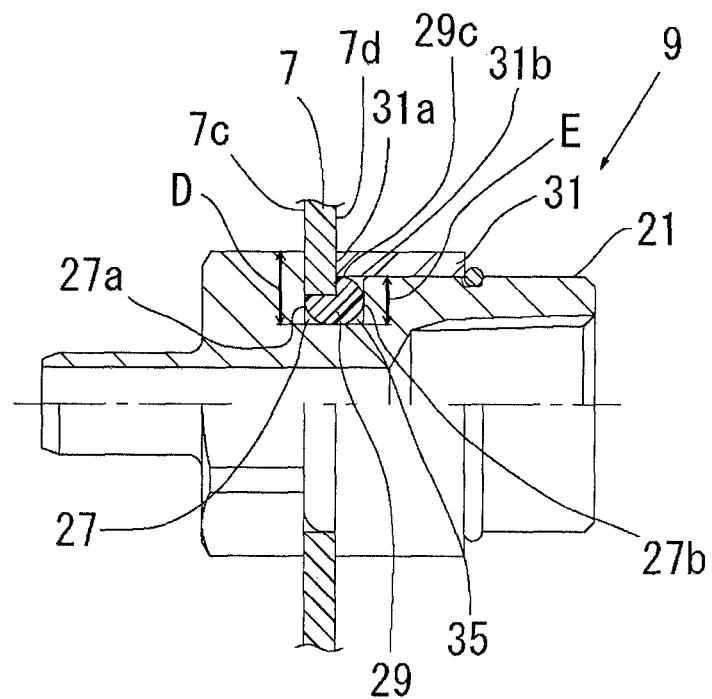
FIG. 2 is a schematic view of a male joint member according to the present invention, illustrating the male joint member at the time of adjusting a misalignment.

It should be noted that when the O-ring 29 is elastically deformed to the maximum, as shown in FIG. 2, the O-ring 29 assumes a substantially elliptic shape, a part of which is cut away, in sectional view. Thus, a part of the O-ring 29 that is pushed aside by the opening edge 7b of the plate 7 is deformed not only in the groove width direction of the annular groove 27 but also in the height direction of the annular groove 27. The front and rear ends 29a and 29b of the O-ring 29 abut against the side walls 27a and 27b, respectively, of the annular groove 27, and the upper end 29c of the O-ring 29 (the upper end of the deformed part of the O-ring 29) abuts against the inner peripheral surface 31b of the collar member 31. Thus, the gap in the annular groove 27 is substantially filled with the O-ring 29. In other words, the length of the annular groove 27 in the groove width direction should preferably be set to a length wherein, when the O-ring 29 is depressed to the maximum, the rear end 29b of the O-ring 29 in the axial direction abuts against the other groove wall surface 27b of the annular groove 27. Further, the groove depth of the annular groove 27 should preferably be set to a length wherein, when the O-ring 29 is depressed to the maximum, the upper end 29c of the O-ring 29 (the upper end of the deformed part of the O-ring 29) abuts against the inner peripheral surface 31b of the collar member 31.

As has been stated above, according to this embodiment, the groove width of the annular groove 27 is greater than the plate thickness of the plate 7, and when the pipe joint members are coupled to each other, the opening edge 7b of the plate 7 depresses the O-ring 29 in the annular groove 27, causing the depressed O-ring 29 to be deformed, thereby allowing the pipe joint member to be displaced relative to the plate 7. Accordingly, the opening edge 7b of the plate 7 can enter the annular groove 27 without being blocked by the outer peripheral surface 22 of the pipe joint member. Thus, it is possible to increase the amount of adjustment available to correct a misalignment between the pipe joint members. In addition, because the plate thickness of the plate 7 is smaller than the groove width of the annular groove 27, it is possible to achieve space saving and weight reduction.

Further, one side surface 7c of the opening edge 7b abuts against one groove wall surface 27a (shoulder part 22a) of the annular groove 27, and the other side surface 7d of the opening edge 7b abuts against the end surface 31a of the collar member 31. Therefore, the plate 7 can be surely clamped, and it is possible to suppress loosening of each male joint member 9 located in the opening 7a of the plate 7.

Further, the plate 7 is supported by being clamped between one groove wall surface 27a (shoulder part 22a) of the annular groove 27 and the end surface 31a of the collar member 31. Thus, one side surface of the plate 7 is supported by utilizing the accommodating groove (annular groove 27) for the O-ring 29. Therefore, the support structure of the plate 7 can be simplified.

Further, when the opening edge 7b of the plate 7 is forced into the annular groove 27 upon adjustment of a misalignment, the deformed part of the O-ring 29 can move into the relief 35. Therefore, it is possible to increase the amount by which the O-ring 29 can be depressed by the opening edge 7b of the plate 7 and hence possible to further increase the amount of adjustment available to correct a misalignment.

Figure 1B:
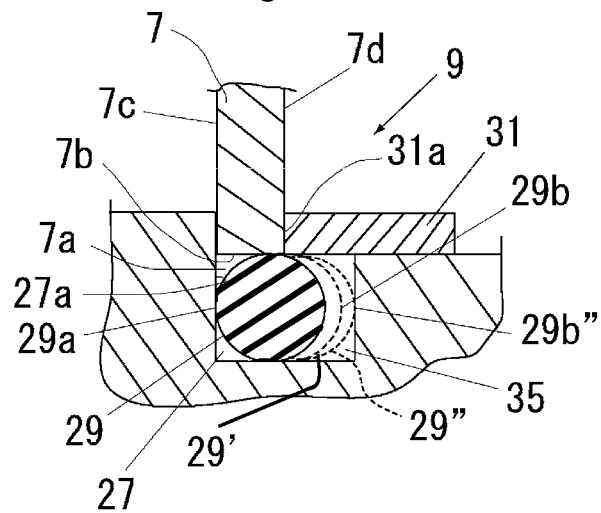

It should be noted that, in the above-described embodiment, the O-ring 29 abuts against one groove wall surface 27a of the annular groove 27, and the relief 35 is formed at the side of the annular groove 27 closer to the other groove wall surface 27b. However, as shown in FIG. 1(b), the O-ring 29 may possibly be displaced toward the other groove wall surface due to the change in position with time (shown by 29' and 29″ in FIG. 1(b)). Even when the O-ring 29 is displaced toward the other groove wall surface to the maximum (i.e. when the rear end 29b″ of the O-ring 29″ abuts against the other groove wall surface 27b of the annular groove 27 and the relief 35 is formed at the side of the annular groove 27 closer to the one groove wall surface 27a), the O-ring 29 is still present in the travel path of the opening edge 7b of the plate 7. Therefore, the O-ring 29″ can be surely depressed by the opening edge 7b of the plate 7.

Figure 6:
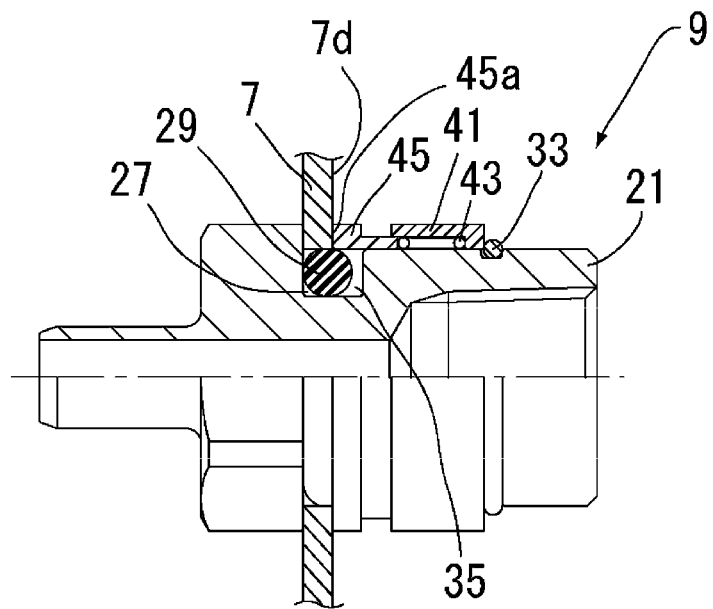
FIG. 6 is a schematic view showing a male joint member of a pipe joint coupling apparatus according to a modification.

Although one embodiment of the pipe joint coupling apparatus according to the present invention has been described above, the present invention is not limited to the described embodiment. For example, the collar member 31 may be set movable in the direction of insertion of the male joint member 9. As shown in FIG. 6, the collar member may have a fixed part 41 fixed to the male joint body 21 and a movable part 45 movably provided in relation to the fixed part 41 through a spring 43. With this arrangement, the forward end 45a of the movable part 45 is pressed against the other side surface 7d of the opening edge 7b by the urging force of the spring 43. In this case, because the collar member 31 is set movable in the direction of insertion of the pipe joint member, the plate 7 can be surely clamped even when there are variations in the plate thickness of the plate 7 or when there are dimensional errors in the plate thickness.

Figure 7:
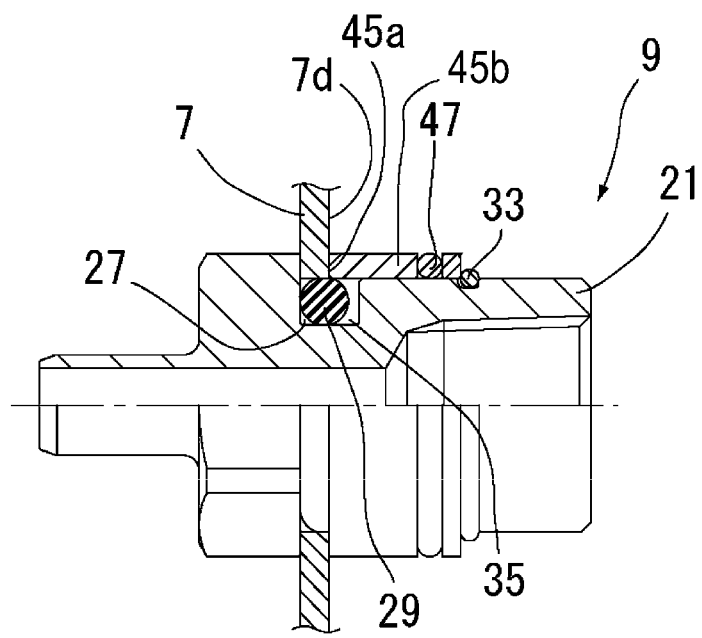
FIG. 7 is a schematic view showing a male joint member of a pipe joint coupling apparatus according to another modification.

It should be noted that, as shown in FIG. 7, the forward end 45a of the movable part 45b may be pressed against the other side surface 7d of the opening edge 7b through an O-ring 47 in place of the spring 43. In this case, when the pipe joint members are coupled together, the pipe joint member 9 is displaced relative to the plate 7 by the displacement of the depressed O-ring 29 in the annular groove 27 and the displacement of the O-ring 47 of the collar member 31. Accordingly, the male joint member 9 can be moved not only in parallel to its axial direction (in a direction along the radial direction of the opening 7a) but also in a direction oblique to the axial direction. Thus, it is possible to increase the amount of adjustment available to correct a misalignment further.

In the above-described embodiment, the plate 7 is provided in relation to the male joint members 9. The plate 7, however, may be provided in relation to the female joint members 8.

The invention claimed is:

1. A pipe joint coupling apparatus comprising:
one pipe joint member forming a male coupling, the one pipe joint member having a first part, a second part axially next to and coaxial with the first part, wherein the second part has an outer peripheral surface of a diameter that is smaller than a diameter of the first part, a pressing part that extends coaxially with the first part from a side of the first part that faces away from the second part in an axial direction, a fluid passage and an annular accommodating groove formed in and circumferentially extending along the outer peripheral surface of the second part, wherein the annular accommodating groove is positioned adjacent to the first part, is radially outwardly open and has opposite annular side surfaces axially spaced apart from each other to define the accommodating groove, and wherein the first part has an annular side surface that faces the second part and is flush with one of the opposite annular side surfaces of the annular accommodating groove;

an other pipe joint member forming a female coupling, the other pipe joint member being aligned with and coupled to the one pipe joint member, the other pipe joint member having a passage and a valve in the passage, wherein the pressing part of the one pipe joint member is configured to press the valve in the other pipe joint member to open the passage of the other pipe joint member and connect to the passage of the one pipe joint member;

a support member that supports the one pipe joint member, the support member having an opening a diameter of which is substantially equal to the diameter of the second part to enable the second part to extend through the opening;

a cylindrical collar member provided on, outside and coaxially with the second part, the cylindrical collar having an axial length such that the cylindrical collar extends axially over a part of the outer peripheral surface of the second part and extends beyond the other of the opposite annular side surfaces of the annular accommodating groove toward the one of the opposite annular side surfaces to clamp the support member in cooperation with the first part on the one pipe joint member with the one pipe joint member extending through the opening; and an elastic member accommodated in the annular accommodating groove;

wherein the support member has one side surface that slidably abuts against the annular side surface of the first part and another side surface that slidably abuts against an end surface of the cylindrical collar member, wherein the opening of the support member extends between and through the one side surface and the other side surface so as to define an opening edge that engages with the elastic member accommodated in the annular accommodating groove, the opening edge and an interior surface of the cylindrical collar member cooperating with each other to confine the elastic member in the annular accommodating groove while leaving a relief space in the annular accommodating groove; and wherein the annular accommodating groove has a width that is greater than a width of the opening edge so as to allow the one pipe joint member to be radially displaced relative to the support member with the opening edge partially and radially entering into the annular accommodating groove while deforming the elastic member, the relief space being sized to accept the deformation of the elastic member; wherein a stop ring is secured on the outer peripheral surface of the second part that prevents the cylindrical collar member from moving in a direction away from the first part; and wherein the support member comprises a plate having a plurality of openings configured to support a plurality of the one pipe joint member.

2. The pipe joint coupling of claim 1, wherein the elastic member is an O-ring disposed along a circumferential direction of the pipe joint member.

3. The pipe joint coupling of claim 1, wherein the collar member is movable in a direction of insertion of one of the one pipe joint member and the other pipe joint member into the other.

* * * * *